United States Patent
Taylor

[11] 3,740,642
[45] June 19, 1973

[54] SPARK PLUG GAP RESISTANCE METER
[75] Inventor: David W. Taylor, Davison, Mich.
[73] Assignee: General Motors Corporation, Detroit, Mich.
[22] Filed: Apr. 24, 1972
[21] Appl. No.: 246,971

[52] U.S. Cl. ............................ 324/16 R, 324/64
[51] Int. Cl. .................................. G01m 15/00
[58] Field of Search ............... 324/15, 16, 62, 64, 324/65

[56] References Cited
UNITED STATES PATENTS
2,324,458  7/1943  Peters ............................ 324/16
2,695,987  11/1954  McCollom ...................... 324/16

Primary Examiner—Michael J. Lynch
Attorney—C. R. Meland, T. G. Jagodzinski and Howard N. Conkey

[57] ABSTRACT

A spark plug gap resistance meter for monitoring the resistance across a spark plug under dynamic conditions including a sampling circuit comprised of a voltage source and a resistor in shunt with the spark plug gap. The sampling circuit samples the resistance of the spark plug gap between ignition pulses supplied thereto. The output of the sampling circuit is a series of voltage pulses, each of which has a magnitude representing the resistance of the spark plug gap during the time period between two ignition pulses. A memory circuit memorizes the magnitude of the voltage pulse representing the minimum resistance across the spark plug gap and drives a meter to indicate the minimum resistance detected which corresponds to the maximum fouling of the spark plug gap. A circuit is provided for preventing the sampling circuit from detecting an erroneous spark plug gap resistance indication resulting from ionization currents during and immediately following ignition and burning of the combustible material in the combustion chamber by disabling the output of the sampling circuit for a predetermined time after burn-out of the combustible material. Another circuit is provided for enabling the memory circuit to track the spark plug gap resistance as represented by the output of the sampling circuit so as to provide a continuous indication thereof.

4 Claims, 1 Drawing Figure

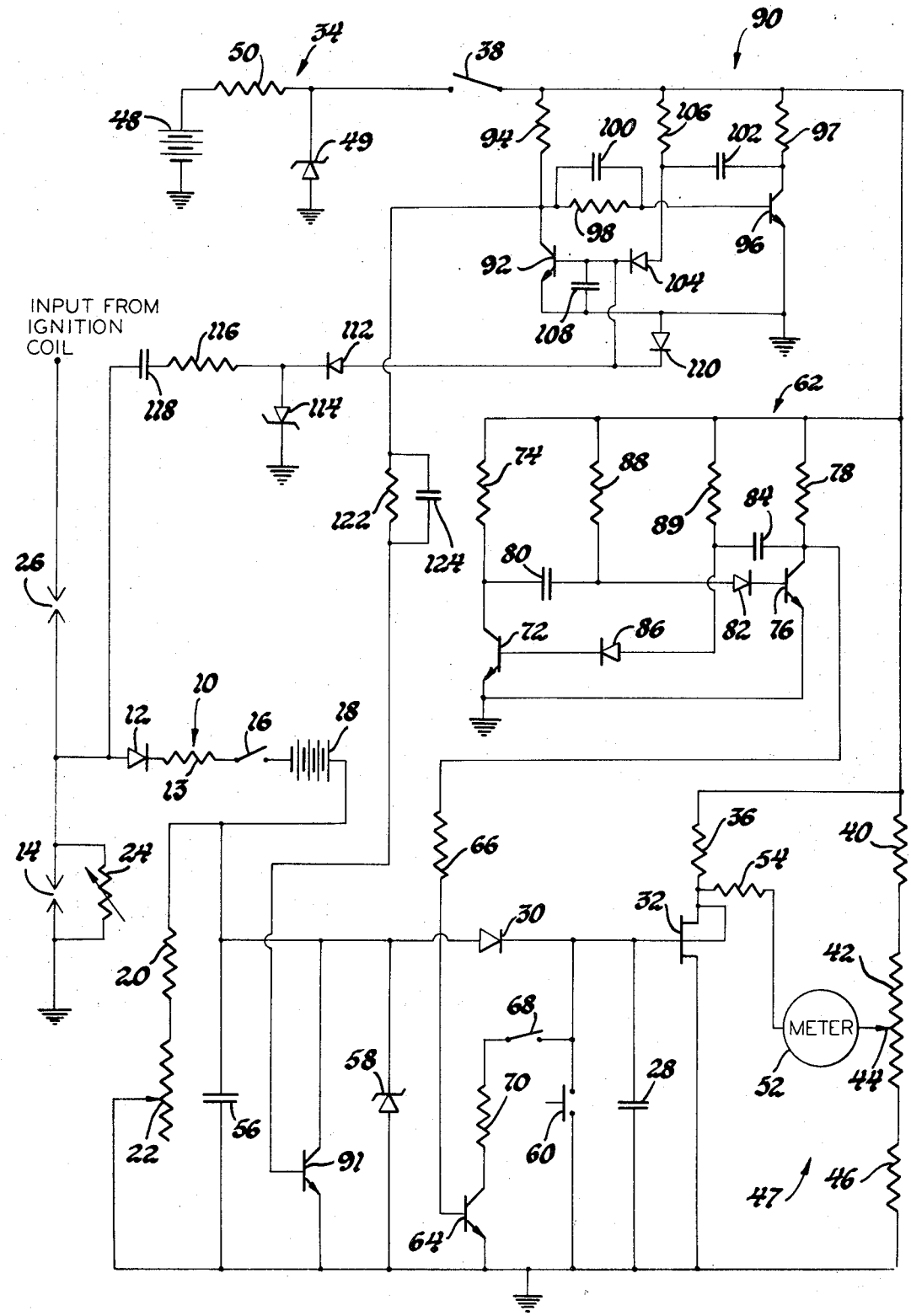

SPARK PLUG GAP RESISTANCE METER

This invention relates to an apparatus for measuring spark plug gap resistance and, more specifically, this invention relates to an apparatus for measuring and indicating the degree of spark plug gap fouling under dynamic conditions.

After a spark plug has been in use for a period of time in an internal combustion engine, various deposits accumulate on the spark plugs which tend to short the center wire to ground resulting in a deterioration in the performance of the vehicle engine. The impedance across the spark plug gap is a measure of the accumulation of deposits, or fouling. It is known that the static measurement of the impedance across the spark plug gap does not provide a true indication of the degree of fouling since the operating environment, such as pressure and temperature, determines the actual degree of fouling. It is the general object of this invention to provide an apparatus for indicating the degree of fouling of a spark plug under operating conditions.

It is another object of this invention to provide an indicator which selectively provides either an indication of the minimum spark plug gap resistance representing maximum spark plug gap fouling or for continuously providing an indication of the instantaneous spark plug gap resistance.

It is another object of this invention to provide an indicator for giving an indication of the spark plug gap resistance under dynamic conditions which is not affected by ionization currents resulting during and immediately following the burning of the combustible materials in the combustion chamber.

The foregoing and other objects may be best understood by reference to the following description of the preferred embodiment and the drawing which is a schematic of the circuit for providing an indication of the degree of fouling of a spark plug gap under dynamic conditions.

Referring to the drawing, a spark plug gap resistance sampling circuit 10 is comprised of a series circuit including a diode 12, a large resistor 13, an on-off switch 16, a DC voltage source 18, a resistor 20, and a calibrating potentiometer 22. This series circuit is connected in shunt with a spark plug gap 14, the degree of fouling of which is to be determined with the potentiometer 22 being connected to the grounded side of the spark plug gap 14. The series circuit functions to sample the resistance of the spark plug gap 14, the resistance being represented by a variable resistor 24. It is to be understood that the spark plug gap 14 is positioned within a combustion chamber of an internal combustion engine to ignite combustible material injected therein. The ungrounded side of the spark plug gap 14 is coupled to the vehicle distributor 26 which in turn is coupled to the vehicle ignition coil (not shown). For purposes of illustration, it will be assumed that the internal combustion engine ignition system, including the distributor 26 and the spark plug gap 14, is a system which produces negative ignition pulses. Consequently, the diode 12 is poled as shown so as to be reverse biased during the occurrence of a negative ignition pulse. The DC voltage source 18 is poled so as to forward bias the diode 12. It will be readily understood by one skilled in the art that for use with an ignition system producing positive pulses, the diode 12 and DC voltage source 18 would be oppositely poled.

Assuming the on-off switch 16 is closed, the DC voltage source 18 supplies a current through the loop including the aforementioned series circuit and the spark plug gap 14 having a magnitude which is inversely proportional to the magnitude of the resistance of the spark plug gap 14 represented by the variable resistor 24. Consequently, a voltage is developed across the resistor 20 and the potentiometer 22 having a magnitude which is inversely proportional to the resistance across the spark plug gap 14 or directly proportional to the degree of fouling thereof. Whenever an ignition pulse occurs, the diode 12 is reverse biased thereby to cause the voltage across the resistor 20 and the potentiometer 22 to fall to zero. Upon the cessation of the ignition pulse, the diode 12 is again forward biased by the DC voltage source 18 and a voltage is again developed across resistor 20 and the potentiometer 22 representing the degree of fouling of the spark plug gap 14. In this manner, a series of voltage pulses are generated across the resistor 20 and the potentiometer 22 during operation of the internal combustion engine with each pulse having a magnitude representing the magnitude of the resistance across the spark plug gap 14. These pulses constitute the output of the sampling circuit 10.

The voltage pulses generated by the sampling circuit 10 are applied across a capacitor 28 through a diode 30. The capacitor 28 in turn is connected across the gate and drain electrodes of a MOSFET 32 whose drain electrode is grounded. As is well known, the MOSFET 32 is characterized by its extremely large input impedance. As will readily be understood by one skilled in the art, the MOSFET 32 could be replaced by any amplifying means having a high input impedance. Consequently, the capacitor 28 charges to a voltage having a magnitude substantially equal to the maximum magnitude of the voltage pulses supplied thereto by the sampling circuit 10. When the diode 12 in the sampling circuit 10 is reverse biased by an ignition pulse and the output of the sampling circuit 10 goes to zero, the diode 30 is reverse biased. Consequently, because of the very high input impedance of the MOSFET 32, the voltage across the capacitor 28 is maintained. In this manner, the capacitor 28 applies the maximum voltage presented thereto from the sampling circuit 10 across the gate and drain electrodes of the MOSFET 32. The magnitude of this voltage is inversely proportional to the resistance of the spark plug gap 14 and directly proportional to the degree of fouling thereof.

The MOSFET 32 has a source electrode connected to a power supply 34 through a resistor 36 and an on-off switch 38 (which will hereinafter be assumed closed). A series circuit including a resistor 40, a potentiometer 42 having a wiper arm 44, and a resistor 46 is connected in parallel with the resistor 36 and the source and drain electrodes of the MOSFET 32 to complete a bridge circuit 47. A regulated voltage is applied to the input of the bridge circuit 47 through the on-off switch 38 by the power supply 34 which is comprised of a DC voltage source 48 whose positive terminal is connected to the electrode of a Zener diode 49 through a current limiting resistor 50 and whose negative terminal is connected to ground. The anode of the Zener diode 49 is also connected to ground.

A meter 52 is series connected with a resistor 54 between the source electrode of the MOSFET 32 and the wiper arm 44 which define the output of the bridge circuit 47. Since the MOSFET 32 inherently has a voltage offset from zero, the wiper arm 44 is positioned relative to the potentiometer 42 such that the bridge 47 is balanced and there is no input to the meter 52 when the capacitor 28 is fully discharged. Upon charging of the capacitor 28 in the manner previously described, the potential at the source electrode of the MOSFET 32 controls the conduction thereof so that current is supplied to the meter 52 which is calibrated to indicate the resistance of the spark plug gap 14 or the degree of fouling thereof.

A capacitor 56 is coupled across the resistor 20 and the potentiometer 22 to provide for filtering of undesired noise and a Zener diode 58 is coupled thereacross to provide for short circuit protection for the gate electrode of the MOSFET 32 by limiting the input thereto to a predetermined maximum. A normally open push button switch 60 is connected in parallel with the capacitor 28 so as to provide a reset function. When manually depressed, the push button switch 60 discharges the capacitor 28 to ground. Thereafter, the circuit is in a condition to again monitor the resistance of the spark plug gap 14.

As previously described, the meter 52 provides an indication of the least resistance of the spark plug gap 14 corresponding to the worst fouling condition that existed while the on-off switch 16 was closed. To provide for a tracking option, that is, to provide for a continuous indication of the instantaneous resistance of the spark plug gap 14, a free-running multivibrator 62 is provided which supplies an alternating output to the base electrode of an NPN transistor 64 through a resistor 66. The emitter of the transistor 64 is connected to ground and the collector thereof is connected to one side of a manually operated switch 68 through a very large resistor 70. The remaining side of the switch is coupled to the cathode of the diode 30. The output of the multivibrator 62 oscillates rapidly with a short "on" time to cause the transistor 64 to saturate for short time intervals. Therefore, when the switch 68 is closed, a discharge path is provided for the capacitor 28 which slowly discharges through the large resistor 70 to thereby let the voltage charge thereon track the input from the sampling circuit 10. In this manner, the voltage across the capacitor 28 is an instantaneous representation of the resistance of the spark plug gap 14. Consequently, the output of the MOSFET 32 and the current through the meter 52 is also a measure thereof with the meter providing a continuous indication of the resistance of the spark plug 14 or the degree of fouling thereof.

The free-running multivibrator 62 is basically comprised of an NPN transistor 72 having its emitter grounded and its collector connected to the power supply 34 through a resistor 74 and the on-off switch 38 and an NPN transistor 76 having its emitter grounded and its collector connected to the power supply 34 through a resistor 78 and the on-off switch 38. The collector of the transistor 72 is connected to the base of the transistor 76 through a capacitor 80 and a diode 82 and the collector of the transistor 76 is connected to the base of the transistor 72 through a capacitor 84 and a diode 86. The junction between the capacitor 80 and the diode 82 is connected to the power supply 34 through a resistor 88 and the on-off switch 38 and the junction between the capacitor 84 and the diode 86 is connected thereto through a resistor 89. The output of the multivibrator 62 is supplied to the transistor 64 from the collector of the transistor 76 and is comprised of the alternating signal previously mentioned for controlling the transistor 64.

For a short time after the combustible material in the combustion chamber of the vehicle engine is ignited, the burning conditions within the combustion chamber cause more current to flow through the sampling circuit 10 than is represented by the true resistance across or the degree of fouling of the spark plug gap 14. To prevent this current from effecting a false indication, the output of the sampling circuit 10 is clamped to ground for a predetermined time period after ignition by the combination of a one-shot multivibrator 90, which is triggered by the ignition pulses, and an NPN transistor 91.

The one-shot multivibrator 90 is comprised of an NPN transistor 92 having its emitter grounded and its collector connected to the power supply 34 through a resistor 94 and the on-off switch 38 and an NPN transistor 96 having its emitter grounded and its collector connected to the power supply 34 through a resistor 97 and the on-off switch 38. The collector of the transistor 92 is coupled to the base of the transistor 96 through the parallel combination of a resistor 98 and a capacitor 100. The collector of the transistor 96 is coupled to the base of the transistor 92 through a capacitor 102 and a diode 104 and to the power supply 34 through the capacitor 102, a resistor 106 and the on-off switch 38. The base of the transistor 92 is capacitively coupled to ground by capacitor 108 and is connected to the cathode of a diode 110 whose anode is connected to ground. The cathode of the diode 110 is coupled to the anode of a diode 112 whose cathode is connected to the anode of a Zener diode 114 and to a resistor 116. The cathode of the Zener diode 114 is connected to ground. The remaining side of the resistor 116 is connected to the anode of the diode 12 through a coupling capacitor 118.

Before the one-shot multivibrator 90 is triggered, the transistor 92 is conducting to present a signal at the collector thereof which is approximately at ground potential. Upon the occurrence of a negative ignition pulse, a negative pulse is coupled to the base of the transistor 92 through the capacitor 118, the resistor 116 and the diode 112. The transistor 92 is biased into nonconduction thereby and remains biased into nonconduction for a time period determined by the time constant of the single-shot multivibrator 90. During this time period, the potential at the collector of the transistor 92 increases to a predetermined voltage. This voltage is coupled to the base of the transistor 91 through the parallel combination of a resistor 122 and a capacitor 124. The collector-emitter circuit of the transistor 91 is coupled across the output of the sampling circuit 10. The voltage pulse applied to the base of the transistor 91 from the single-shot multivibrator 90 saturates the transistor 91 to maintain the output of the sampling circuit 10 clamped to near ground potential for the time period of the voltage pulse which insures that the sampling circuit 10 will not be affected by the burning conditions in the combustion chamber. As can be seen, upon the occurrence of each negative ignition pulse, the single-shot multivibrator 90 is triggered in the manner previously described.

What has been described is an apparatus for providing an indication of the resistance or degree of fouling of a spark plug gap in a vehicle internal combustion engine under dynamic conditions in which the output may be selectively an indication of the minimum resistance or a continuous indication of the instantaneous resistance and in which the effects of combustion within the chamber on the resistance of the spark plug are eliminated.

The detailed description of the preferred embodiment of the invention for the purpose of explaining the principles thereof is not to be considered as limiting or restricting the invention, since many modifications may be made by the exercise of skill in the art without departing from the scope of the invention.

What is claimed is:

1. An apparatus for providing an indication of the resistance across a spark plug gap comprising a series circuit coupled in shunt with the spark plug gap, the series circuit including an impedance and a constant voltage source, the series circuit and the spark plug gap combining to supply an output voltage across the impedance having a magnitude inversely proportional to the resistance across the spark plug gap; a capacitor; means for coupling the output voltage across the capacitor through a one-way current passing means to charge the capacitor to a voltage substantially equal to the output voltage; amplifying means having a high input impedance terminal and an output terminal; circuit means for applying the voltage on the capacitor to the high input impedance terminal, the amplifying means being responsive to the magnitude of the voltage applied to the high input impedance terminal for generating at its output terminal a signal directly related to said magnitude; and indicator means coupled to the output terminal of the amplifying means and responsive to the signal generated thereat for indicating the resistance across the spark plug gap.

2. An apparatus for providing an indication of the resistance across a spark plug gap positioned in a combustion chamber and having a series of ignition voltage pulses applied thereacross to effect ignition of combustible materials injected into the combustion chamber comprising a series circuit coupled in shunt with the spark plug gap, the series circuit including a first one-way current passing means, an impedance and a constant voltage source, the first one-way current passing means being poled so as to be reverse biased by the ignition voltage pulses applied across the spark plug gap and the constant voltage source being poled so as to forward bias the first one-way current passing means when said means is not reversed biased by the ignition voltage pulses, the series circuit and the spark plug gap combining to generate an output voltage across the impedance when the first one-way current passing means is not reverse biased by an ignition voltage pulse, the output voltage having a magnitude inversely proportional to the resistance across the spark plug gap; a capacitor; means for coupling the output voltage across the capacitor through a second one-way current passing means to charge the capacitor to a voltage substantially equal to the output voltage; amplifying means having a high input impedance terminal and an output terminal; circuit means for applying the voltage on the capacitor to the high input impedance terminal, the amplifying means being responsive to the magnitude of the voltage applied to the high input impedance terminal for generating at its output terminal a signal directly related to said magnitude, and indicator means coupled to the output terminal of the amplifying means and responsive to the signal generated thereat for indicating the resistance across the spark plug gap.

3. An apparatus for providing an indication of the resistance across a spark plug gap positioned in a combustion chamber and having a series of ignition voltage pulses applied thereacross to effect ignition of combustible materials injected into the combustion chamber comprising a series circuit coupled in shunt with the spark plug gap, the series circuit including a first one-way current passing means, an impedance and a constant voltage source, the first one-way current passing means being poled so as to be reverse biased by the ignition voltage pulses applied across the spark plug gap and the constant voltage source being poled so as to forward bias the first one-way current passing means when said means is not reversed biased by the ignition voltage pulses, the series circuit and the spark plug gap combining to generate an output voltage across the impedance when the first one-way current passing means is not reverse biased by an ignition voltage pulse, the output voltage having a magnitude inversely proportional to the resistance across the spark plug gap; a capacitor; means for coupling the output voltage across the capacitor through a second one-way current passing means to charge the capacitor to a voltage substantially equal to the output voltage, amplifying means having a high input impedance terminal and an output terminal; circuit means for applying the voltage on the capacitor to the high input impedance terminal, the amplifying means being responsive to the magnitude of the voltage applied to the high input impedance terminal for generating at its output terminal a signal directly related to said magnitude; indicator means coupled to the output terminal of the amplifying means and responsive to the signal generated thereat for indicating the resistance across the spark plug gap; a high impedance element; selectively operable switch means having a first position for coupling the high impedance element across the capacitor and a second position for decoupling the high impedance element from across the capacitor, whereby the voltage on the capacitor tracks the output voltage coupled thereacross through the second one-way current passing means to cause the meter means to provide a continuous indication of the instantaneous value of the resistance across the spark plug gap when the selectively operable switch means is in the first position and the capacitor is charged to a voltage substantially equal to the maximum output voltage coupled thereacross through the second one-way current passing means to cause the meter means to provide an indication of the minimum resistance across the spark plug gap when the selectively operable switch means is in the second position.

4. An apparatus for providing an indication of the resistance across a spark plug gap positioned in a combustion chamber and having a series of ignition voltage pulses applied thereacross to effect ignition of combustible materials injected into the combustion chamber comprising a series circuit coupled in shunt with the spark plug gap, the series circuit including a first one-way current passing means, an impedance and a constant voltage source, the first one-way current passing means being poled so as to be reverse biased by the ignition voltage pulses applied across the spark plug gap and the constant voltage source being poled so as to forward bias the first one-way current passing means when said means is not reverse biased by the ignition voltage pulses, the series circuit and the spark plug gap combining to generate an output voltage across the impedance and having a magnitude inversely proportional to the resistance across the spark plug gap in the absence of an ignition voltage pulse, the voltage across the impedance being zero when the first one-way current passing means is reverse biased by the ignition voltage pulses; one shot multivibrator means coupled to the spark plug gap and responsive to an ignition voltage pulse for clamping the voltage across the impedance of the series circuit at zero potential for a predetermined time period following the ignition of the combustible material in the combustion chamber to prevent an erroneously high output voltage from appearing across the impedance resulting from excessive currents through the spark plug gap caused by combustion conditions within the combustion chamber; a capacitor; means for coupling the output voltage across the capacitor through a second one-way current passing means to charge the capacitor to a voltage having a magnitude substantially equal to the magnitude of the output voltage; amplifying means having a high impedance input terminal and an output terminal; circuit means for coupling the voltage on the capacitor to the high impedance input terminal, the amplifying means being responsive thereto for generating a signal at the output terminal having a magnitude related thereto; and meter means coupled to the output terminal and responsive to the signal generated thereat for indicating the resistance across the spark plug gap.

* * * * *